J. R. DAVIS.
Wheel-Cultivator.
No. 40,915.
Patented Dec. 15, 1863.
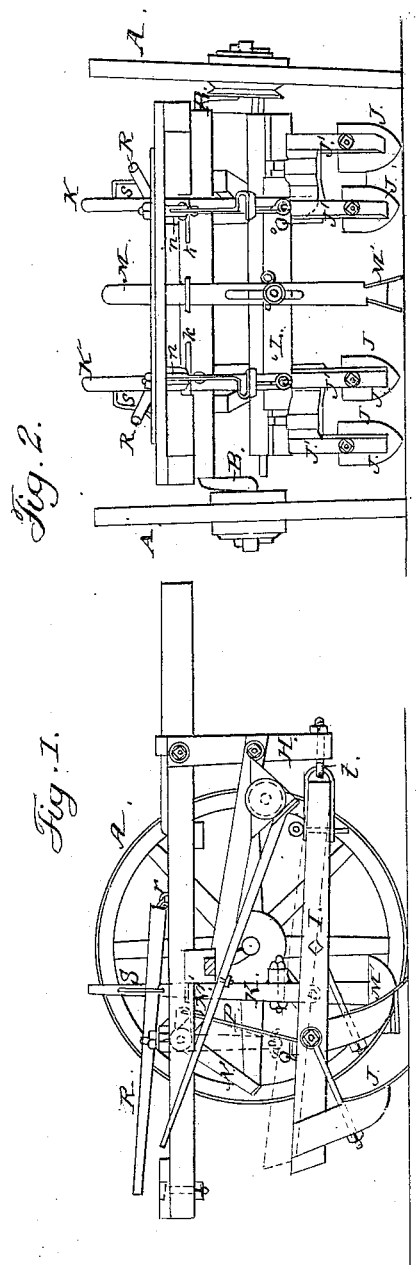
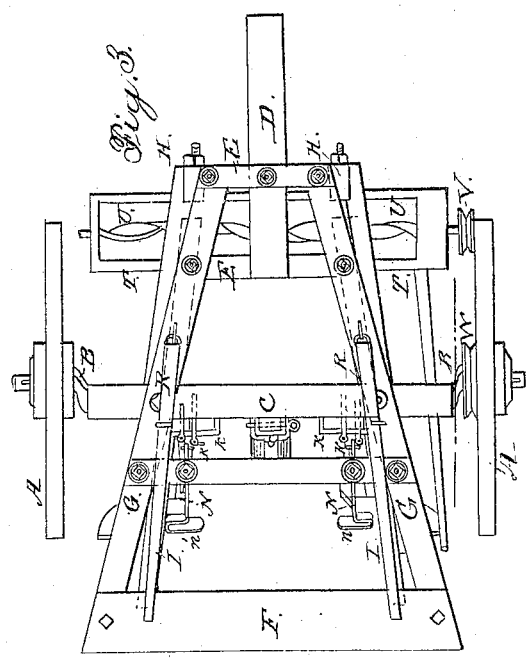
WITNESSES:
INVENTOR:

UNITED STATES PATENT OFFIC

JOHN R. DAVIS, OF BLOOMFIELD, IOWA.

IMPROVEMENT IN CULTIVATORS.

Specification forming part of Letters Patent No. 40,915, dated December 15, 1863.

*To all whom it may concern:*

Be it known that I, JOHN R. DAVIS, of Bloomfield, in the county of Davis and State of Iowa, have invented a certain new and useful Improvement in Cultivators; and I do hereby declare the following to be a full and exact description of the same, reference being had to the accompanying drawings, making part of this specification, in which—

Figure 1 is a side elevation of my improved cultivator, the nigh wheel being removed to exhibit more clearly the arrangement of the operating mechanism. Fig. 2 is a rear elevation thereof, and Fig 3 is a plan of the same.

This invention consists in an improved mode of operating the plows or cultivator-teeth, whereby all the plows may be elevated and lowered simultaneously, or those on either side alone, the necessity of the operator calling his hands into requisition being dispensed with, and novel means provided for suspending said plows at a suitable height when the machine is passing over ground not to be cultivated, as will be hereinafter fully explained.

To enable others skilled in the art to which my invention appertains to fully understand and use the same, I will proceed to describe its construction and operation.

In the accompanying drawings, A A' represent the carrying-wheels, which are journaled upon the lower horizontal ends of crooked axles B B, rigidly fastened in the ends of the main axle C. This method of mounting the wheels is adopted for the purpose of elevating the axle C (which constitutes part of the framing of the machine) to the required height without increasing the diameters of the wheels.

D represents the tongue, which is bolted or otherwise securely fastened to the cross-pieces E E, and instead of extending to the axle C and being attached thereto, as is usually the case, projects but a very short distance from the foremost part of the machine, so as to present an unobstructed view of the plants to the driver from his seat F. This seat F is mounted upon the rear ends of hounds G G, which converge toward the front of the machine, where they are fastened to the uprights H H by screws, bolts, or otherwise. To the lower ends of these uprights H H the front ends of plow-beams I I are attached by means of universal joints *i*. (One shown in Fig. 1.)

J represents the cultivator-teeth J' of which are rigidly attached t beams I in any suitable manner.

K K are uprights rising from beams I, passing through metallic the axle C, and designed to keep tor-teeth J in the proper vertical p( the machine is in operation by m $k'$ $k'$ resting upon said metallic lo( L represents a transverse bar ( tached to the uprights K K by b through corresponding orifices i The bar L may be provided with these orifices, so as to permit the : tal adjustment of the lower end rights K K. The upper ends are a( zontally, so as to preserve the cor of the plows by being shifted fron of the loops $k$ $k$, where they are k by the pins $k^2$ $k^2$.

M represents an upright, to tl of which is affixed a shield, M'.

N N represent treadles of pecul tion, suspended from a transver and pivoted to lugs $n$ $n$, rigidly aff N' is a short arm or lever forme of the treadles N, and situated at therewith. To the end of the ar tached a rod, P, which is connecte( end to the shanks J', or to the which said shanks are secured, b; staple, Q. The hooked ends $n'$ treadles not only afford conveni the feet of the driver, but by th( abled to elevate a portion or all vator-teeth when they meet ob passing through the soil, and also teeth at a sufficient height abov( by simply depressing the ends $n'$ ing them to the staples Q, as sho\ outline in Fig. 1.

R R may represent levers piv( the hounds G G, and passing th lic loops S S upon the uprights K levers the driver is enabled to thr from side to side with great facili prevent them from uprooting any may be out of line.

The above machine is well a used in connection with suitable s anism, as illustrated in Fig. 3.

T represents a hopper support line upon the plow-beams. preference provided with a , U, rotated by a pulley, V, from an ordinary band run- r pulley, W, formed upon the of the machine will be read- om the preceding description. it cultivator-frames have be- d to be raised separately or l or foot levers and retained position. This, therefore, I laim.
escribed my invention, what I claim as new therein, and desire to secure by Letters Patent, is—

In combination, with the pivoted cultivator-frames I J J' K L, the hooked foot-levers N N' n', rods P, and staples Q, all constructed, arranged, and operating, as specified, so that either or both the frames may be readily raised by the feet of the driver and retained by hooking the treadles into the staples Q, as explained.

JOHN R. DAVIS.

Witnesses:
A. J. AUGDEN,
AMOS STECKEL.